United States Patent [19]

Mercure

[11] Patent Number: 5,125,729
[45] Date of Patent: Jun. 30, 1992

[54] MULTIFOCAL CONTACT LENS

[75] Inventor: Robert Mercure, Saint-Denis-de-Brompton, Canada

[73] Assignee: Les Laboratoires Opti-Centre Inc., Sherbrooke, Canada

[21] Appl. No.: 695,093

[22] Filed: May 3, 1991

[51] Int. Cl.⁵ .............................................. G02C 7/04
[52] U.S. Cl. ................................................... 351/161
[58] Field of Search ............... 351/160 R, 160 H, 161, 351/162

[56] References Cited

U.S. PATENT DOCUMENTS 4,971,432 11/1990 Koeniger ........................ 351/161

Primary Examiner—Scott J. Sugarman

[57] ABSTRACT

The lens includes on its front face a central spherical circular area surrounded by an annular aspherical area. Optionally the lens may include a second spherical annular area surrounding the first annular area. Another annular area which may be separated from the second annular area by a transition annular area, may complete the front face of the lens. The rear face may include a central circular spherical area which may be surrounded by a tangential annular area. A toric area may be centrally disposed on the rear face central area.

6 Claims, 2 Drawing Sheets

MULTIFOCAL CONTACT LENS

BACKGROUND OF THE INVENTION (a) Field of the Invention

The present invention relates to multifocal contact lenses. More particularly, the invention relates to a hydrophilic contact lens of the composite multifocal type for simultaneous and alternate vision, enabling to correct cases of presbyopia which may be associated with all kinds of ametropia and which enables a person to have a good vision from all distances.

As used in the present specification and claims, the terms "multifocal", "composite", "simultaneous vision" and "alternate" will be defined as follows. Multifocal: lens having more than one focus. The rays passing through the lens are focused at various distances. Composite: the optical zones are of two very different types, spherical and aspherical. Simultaneous vision: correction of vision is available for all distances without requiring a displacement of the lens. Alternate: in reading position, head downwardly inclined, the lens has a tendency to slightly rise towards the upper part of the eye. This displacement enables the use of the second annular zone thereby contributing to vision for reading.

(b) Description of Prior Art

It is known that presently, multifocal contact lenses because of their construction and design, are not satisfactory to most people.

SUMMARY OF INVENTION

It is an object of the present invention to provide a multifocal contact lens which comprises on a front face thereof, a central circular area having a spherical surface, and a ring shaped area surrounding the central circular area, having an aspherical surface.

In accordance with another embodiment, the multifocal lens may include a second ring shaped area which surrounds the first shaped area and having a spherical surface.

In accordance with another embodiment, the multifocal lens may include a third ring shaped area having a spherical surface, and a fourth ring shaped area completing the front face of the lens, the third ring shaped area constituting a transition area between the second and fourth ring shaped areas.

In accordance with another embodiment, the posterior face of the lens may inlude a central circular spherical area, which may be surrounded by a tangential annular area.

In accordance with another embodiment, a toric area may be centrally disposed on the central area of the posterior face.

DESCRIPTION OF PREFERRED EMBODIMENTS

Reference will be made to FIGS. 1 to 5 for a description of the front face of a lens according to the invention.

The optical part is essentially formed of two distinct concentric areas, namely a central circular spherical area and an annular aspherical area. An annular spherical area may also be provided although it is not essential.

The non optical part is formed of two concentric annular areas.

Figure 1:
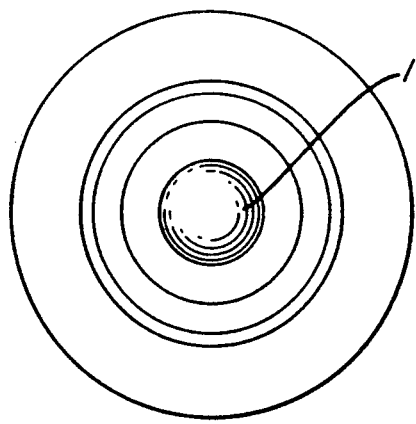
FIG. 1 is a schematic view of the front face of a multifocal lens according to the invention outlining the central area.

Referring to FIG. 1 which illustrates the central area, it will be seen that the multifocal lens has in its front face a central circular area 1 having a spherical face. This area is responsible for distance vision. The diameter of the circumference may vary depending on the needs of the carrier and normally covers about 50% to 70% of the pupil. The ametropia to be corrected determines the dioptric power of the central area.

Figure 2:
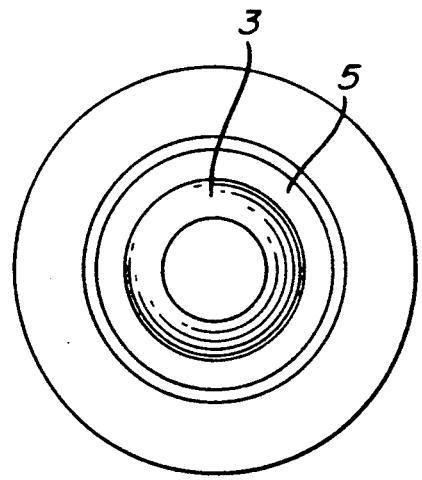
FIG. 2 outlines the first ring shaped area.

FIG. 2 shows the first annular area 3. This area is in the shape of a ring and surrounds the central area. The surface is aspherical and enables vision at all distances including reading. The inner diameter of the ring corresponds to the central circular area, while the outer diameter varies in direct relation to the inner diameter. The width of the ring varies slightly depending on the radius of the second annular area 5 and the tangent angle of the template mounted on the lathe. The dioptric power of this zone is in the form of progressive addition and varies from a zero addition at the inner periphery of the ring to the maximum of the addition at the outer periphery.

Figure 3:
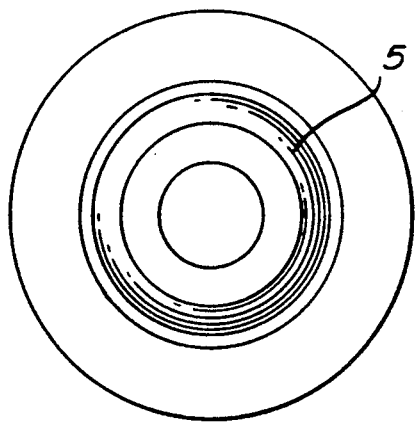
FIG. 3 outlines the second ring shaped area.

FIG. 3 shows the second annular area. This area is in the shape of a ring which surrounds the first annular area 3. The surface is spherical and is exclusively intended for reading. The inner diameter of the ring corresponds to the outer diameter of the annular area 3, which outer diameter varies solely with respect to the diameter of the lens.

The dioptric power of this area is in the form of addition, i.e. the positive (convex) power which must be added to correct presbyopia.

Figure 4:
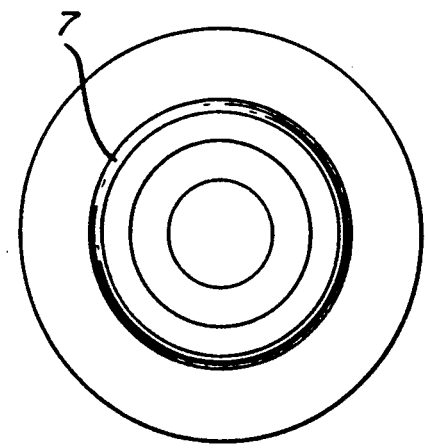
FIG. 4 outlines the third ring shaped transition area.

FIG. 4 shows the third annular area 7 which is a transition spherical area and constitutes a junction between annular area 5 and annular area 9.

Figure 5:
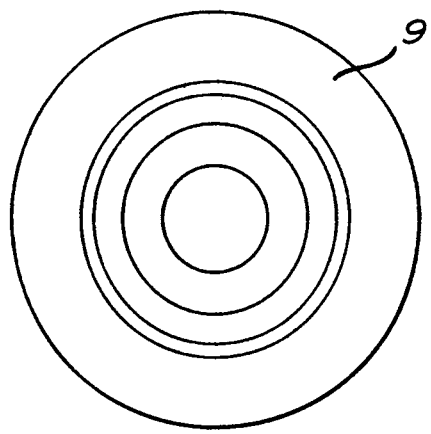
FIG. 5 outlines the fourth ring shaped transition area.

The fourth annular area 9 is illustrated in FIG. 5. This area completes the front face of the lens. Its optical construction may vary to a large extent depending on needs and the intent of the designer of the lens. It may be non prismatic or prismatic to facilitate the vertical displacement of the lens and promote the use of the second annular area 5 for reading.

In the case of an astigmatic correction, the area may be prismatic in order to ensure a good positioning of the axis of the astigmatic correction.

Figure 6:
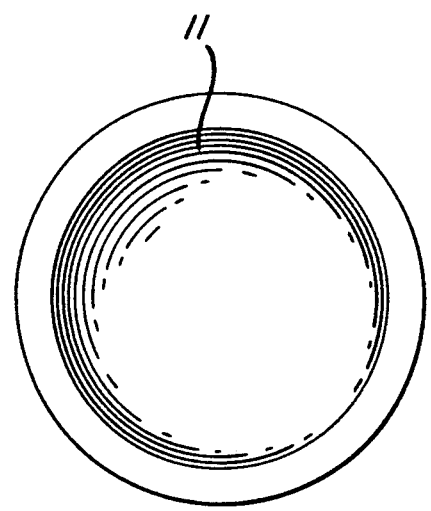
FIG. 6 shows the central area of the rear face.
Figure 7:
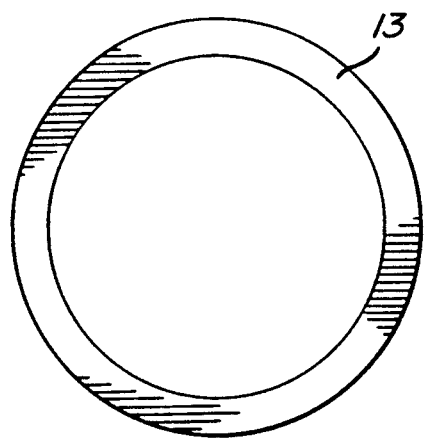
FIG. 7 shows the tangential annular area of the rear face.
Figure 8:
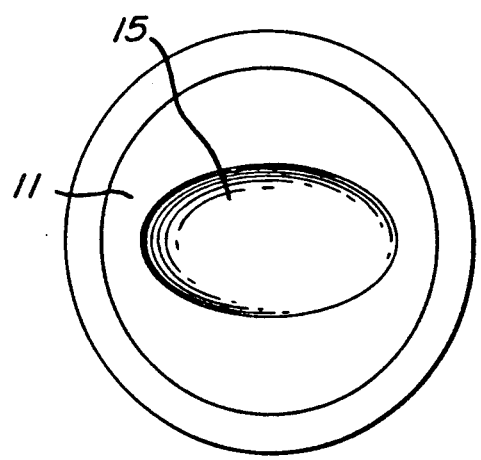
FIG. 8 shows an optional embodiment including a toric area disposed in the central area of the rear face.

Referring now to the rear face, when the latter needs a correction, as seen in FIGS. 6 to 8, it will be realized that it may comprise a central spherical area 11, an annular tangential concentric area 13 and an optional central toric area 15 (FIG. 8).

The central area 11 is circular and has a spherical surface. This area is responsible for the adjustment of the lens on the cornea and its radius depends on the radius of the mean curve of the cornea.

The tangential area 13 (FIG. 7) is in the shape of a ring and surrounds the central area 11. The surface is rectilinear and is tangential to the curve of the central area. The area plays a secondary part in the adjustment of the lens on the eye.

The toric area 15 (FIG. 8) is optional and may be required in the case of an astigmatic correction. The surface is toric and is disposed centrally with respect to the central area 11. The radii of this area are chosen to produce the required cylindrical correction.

Lenses according to the invention may be manufactured with toric and spherical lathes provided with templates and eccentric axes. Polishing of the surfaces is carried out by standard methods which are known to those skilled in the art.

I claim:

1. Multifocal contact lens comprising on a front face thereof a central circular area having a spherical surface, said central circular area being dimensioned to cover about 50% to 70% of a pupil of an eye, and a ring shaped area surrounding the central area having an aspherical surface having a dioptric power in the form of progressive addition which varies from a zero addition at inner periphery of said ring shaped area to a maximum addition at outer periphery thereof, said aspherical surface enabling vision at all distances including reading.

2. Multifocal contact lens according to claim 1, which includes a second ring shaped area surrounding the first ring shaped area and having a spherical surface.

3. Multifocal contact lens according to claim 2, which comprises a third ring shaped area having a spherical surface and a fourth ring shaped area completing the front face of the lens, said third ring shaped area constituting a transition area between the second and fourth ring shaped areas.

4. Multifocal contact lens according to claim 3, which includes a second central circular spherical area on the posterior face of said lens.

5. Multifocal contact lens according to claim 4, which includes a tangential annular area which surrounds said second central spherical area.

6. Multifocal contact lens according to claim 5, including a toric area centrally disposed relative to said second central circular spherical area.

* * * * *